(12) United States Patent
Carlson (10) Patent No.: US 10,528,579 B2
(45) Date of Patent: *Jan. 7, 2020

(54) METHOD, SYSTEM, AND APPARATUS FOR ENTERPRISE WIDE STORAGE AND RETRIEVAL OF LARGE AMOUNTS OF DATA

(71) Applicant: YottaStor, LLC, Herndon, VA (US)

(72) Inventor: Robert John Carlson, Lovettsville, VA (US)

(73) Assignee: YottaStor, LLC, Herndon, VA (US)

( * ) Notice: Subject to any disclaimer, the term of this patent is extended or adjusted under 35 U.S.C. 154(b) by 203 days.

This patent is subject to a terminal disclaimer.

(21) Appl. No.: 15/662,678

(22) Filed: Jul. 28, 2017

(65) Prior Publication Data

US 2017/0344613 A1   Nov. 30, 2017

Related U.S. Application Data

(63) Continuation of application No. 14/338,785, filed on Jul. 23, 2014, now Pat. No. 9,747,350, which is a
(Continued)

(51) Int. Cl.
*G06F 15/173* (2006.01)
*G06F 16/2458* (2019.01)
*H04L 29/08* (2006.01)

(52) U.S. Cl.
CPC ...... *G06F 16/2471* (2019.01); *H04L 67/1042* (2013.01); *H04L 67/1097* (2013.01)

(58) Field of Classification Search
None
See application file for complete search history.

(56) References Cited

U.S. PATENT DOCUMENTS 7,069,295 B2   6/2006   Sutherland et al.
7,496,828 B2*  2/2009   Relyea ............... G06F 17/2247
                                                              715/200

(Continued)

OTHER PUBLICATIONS

International Search Report and Written Opinion dated Apr. 10, 2012 from corresponding International Patent Application No. PCT/US2011/063728.

*Primary Examiner* — Mohamed Ibrahim
(74) *Attorney, Agent, or Firm* — Maier & Maier, PLLC (57) ABSTRACT

A scalable network of mobile data storage containers that are connected in peer-to-peer networks to archive large data storage capacities. The various embodiments provide a method of extracting a large amount of data from a variety of sources and storing the extracted data in mobile, storage units. The various embodiments provide storage units housed in mobile containers that can store multiple days/weeks of sensor data in the order of petabytes (1024 terabytes). The various embodiments, integrate high performance computing devices into the mobile storage containers that are able to perform critical extraction, pattern, and index processing on the sensor data. The various embodiments, provide a method for the efficient physical transport of the mobile storage containers from current locations to a center analysis location for re-connecting in another peer-to-peer network for integration into a central enterprise data warehouses.

20 Claims, 5 Drawing Sheets

Related U.S. Application Data continuation of application No. 13/313,509, filed on Dec. 7, 2011, now Pat. No. 8,819,163.

(60) Provisional application No. 61/420,972, filed on Dec. 8, 2010.

(56) References Cited

U.S. PATENT DOCUMENTS

| | | |
|---|---|---|
| 7,603,466 B2 | 10/2009 | Killian-Kehr et al. |
| 7,810,144 B2 | 10/2010 | Haff et al. |
| 7,937,393 B2 | 5/2011 | Prahlad et al. |
| 9,507,799 B1 * | 11/2016 | Goodson .............. G06F 16/13 |
| 2002/0114341 A1 | 8/2002 | Sutherland et al. |
| 2006/0010372 A1 * | 1/2006 | Kaler .............. G06F 17/2229 715/255 |
| 2006/0168403 A1 | 7/2006 | Kolovson |
| 2007/0078809 A1 | 4/2007 | Semkow et al. |
| 2008/0133708 A1 | 6/2008 | Alvarado et al. |
| 2012/0005307 A1 | 1/2012 | Das et al. |
| 2012/0030181 A1 | 2/2012 | Adhiraju et al. |
| 2014/0020083 A1 | 1/2014 | Fetik |
| 2014/0237070 A1 | 8/2014 | Choi |

\* cited by examiner

METHOD, SYSTEM, AND APPARATUS FOR ENTERPRISE WIDE STORAGE AND RETRIEVAL OF LARGE AMOUNTS OF DATA

CROSS-REFERENCE TO RELATED APPLICATIONS

This application claims priority from U.S. patent application Ser. No. 14/338,785, filed on Jul. 23, 2014, entitled "Method, System, and Apparatus for Enterprise Wide Storage and Retrieval of Large Amounts of Data," which in turn claims priority from U.S. patent application Ser. No. 13/313,509, filed on Dec. 7, 2011, now U.S. Pat. No. 8,819,163, issued on Aug. 26, 2014, entitled "Method, System, and Apparatus for Enterprise Wide Storage and Retrieval of Large Amounts of Data," which claims benefit of U.S. Provisional Patent Application No. 61/420,972, filed on Dec. 8, 2010, the entire contents of which

BACKGROUND

International Data Corporation (IDC) a global provider of market intelligence, advisory services, and events for the information technology, telecommunications, and consumer technology markets in May 2010 provided a forecast on the size of the information storage universe. According to the IDC study, information storage in the 2020s is expected to be 35 Zettabytes (i.e. 35,000,000,000,000,000,000,000 bytes), an amount nearly 44 times larger than exists today. As a consequence, solutions must be found that are well beyond the capabilities of existing storage technology in order to deal with this explosion of information.

This explosion of data storage is in part due to the creation of human generated tabular data that is typically stored in relational databases and tables or arrays, human generated unstructured data, and machine generated data which is the newest category of information. Given the speed of computation of computers, machine generated data will likely be the greatest contributor to this growth.

This machine generated data has a number of unique characteristics that do not exist in the more traditional corpra of data created by organizations. Among these unique characteristics is that the data is immutable, persistent and typically very large in size. In addition, because these machines used to create the data typically cost significant amounts of money, the value of the data is critical to the inherent business process that created it and thus the retention period of this data is typically significantly longer than more traditional forms of data.

With this growth in machine generated data the cost of storage, retrieval and analysis of the data becomes expensive and prohibitive using traditional data storage architectures.

For example, our military and homeland defenders are in the midst of a transformation that will increasingly rely upon speed, mobility and information to find, confront and defeat the enemy. The rapid growth of Remotely Piloted Aircraft that carry multiple sensors are becoming critical to the mission success. The operational edge is rapidly moving to forward-deployed bases and expeditionary forces which must rely on very limited resources and infrastructure but the requirement is growing to capture, analyze and exploit massive amounts of machine generated data in this harsh environment. Current enterprise architectures cannot scale up to handle the increase in information now occurring or that is predicted for the future. This requires that new approaches to storing and accessing vast amounts of data be developed.

Similarly, multiple private industry and governmental operations also are generating huge amounts of data that require storage, retrieval, and analysis in order to be useful in the business, industrial, and governmental setting. For instance, in the Oil and Gas industry, major corporations must routinely transfer data from their exploitation platforms performing sensory surveys of potential oil fields that may exist underwater because the amount of data being captured cannot be adequately stored and process on these state-of-the-art ships.

Currently, the various business, financial and governmental organizations attempt to use a wide variety of sources (computers, sensors, data capture devices) to achieve specific operational outcomes. However, these sources produce massive amount of information, which must be transferred to a central location for further processing, analysis and storage. This approach is not scalable because the current and projected network transfer capacity is magnitudes "too small" to move the massive amount of data from the capture location to the central processing location with acceptable latency.

It is highly desirable to be able to store and exploit such data from a desired source in real time or near-real time to meet the needs of the user. However, it is of equal importance to be able to move this archive of data and information to a different location so that analysts can have use of that data for their ongoing tasks.

SUMMARY

In one exemplary embodiment, a method for collecting, storing, and analyzing information is disclosed. The method can include installing analysis software on a first mobile data storage unit at a first location, transporting the first mobile data storage unit to an area of operations, connecting the first mobile data storage unit with one or more mobile data storage units in a peer-to-peer network, collecting information in the area of operations, transmitting the collected information to the first mobile data storage unit, and sorting and storing the transmitted information in the first mobile data storage unit, wherein the analysis software allows the first mobile data storage unit to be identified to the mobile data storage units in the peer-to-peer network and allows the data storage units to have access to information in the other mobile data storage units in the peer-to-peer network.

In another exemplary embodiment, a system for collecting, storing, and analyzing information is disclosed. The system can include analysis software, a first mobile data storage unit at a first location, on which the analysis software is installed, and a plurality of mobile data storage units connected with the first data storage units in a first peer-to-peer network, wherein the first mobile data storage unit is transported to an area of operations, the analysis software allows the first mobile data storage unit to be identified to the plurality of mobile data storage units in the peer-to-peer network and allows the first mobile data storage unit and the plurality of mobile data storage units to have access to information in the other mobile data storage units in the peer-to-peer network, information collected in the area of operations is transmitted to the first mobile data storage unit, and the transmitted information is sorted and stored in the first mobile data storage unit.

BRIEF DESCRIPTION OF EXEMPLARY EMBODIMENTS OF THE DRAWINGS

The accompanying drawings, which are incorporated herein and constitute part of this specification, illustrate exemplary embodiments, and together with the general description given above and the detailed description given below, serve to explain the features claimed herein.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

Figure 1:
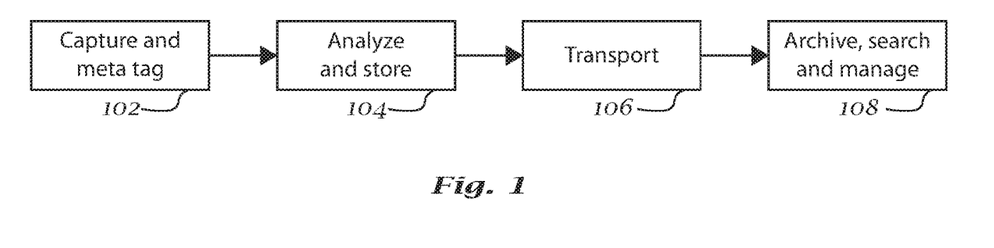
FIG. 1 illustrates an overview of an exemplary embodiment of the end to end treatment of large amounts of data.

Referring first to FIG. 1, an exemplary embodiment of the overall end to end treatment of data is illustrated. At step 102, data can be initially captured and tagged. Data can be from any number of sources, for example an aerial platform. In other exemplary embodiments, data collection can occur in stock exchanges, healthcare situations, and any variety of industries and professions. At step 104, the data can then be analyzed and stored in a mobile data container. When the data container is filled to a predetermined capacity, at step 106 it can be transported from its location to a longer term analysis and storage facility. At step 108, the data is then archived and stored for any period of time desired by the user.

Figure 2:
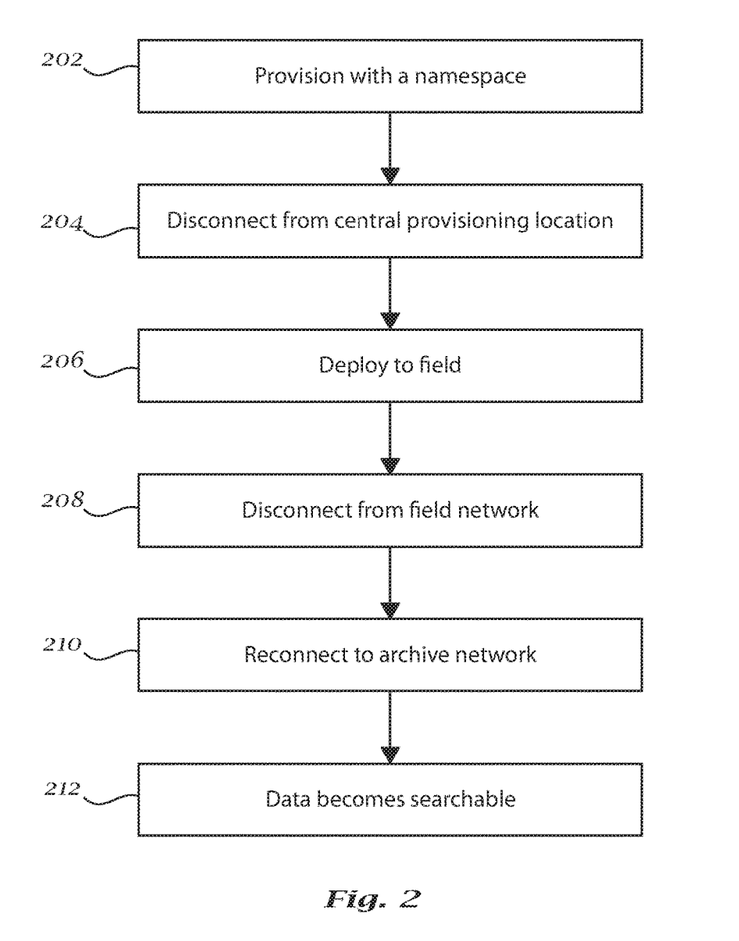
FIG. 2 illustrates a system overview of an exemplary embodiment of the provisioning, fielding, and subsequent treatment of mobile data storage containers.

Referring now to FIG. 2, a system overview of an exemplary embodiment of a mobile data storage unit 302 is illustrated. In general, and as more fully described below, at step 202 a mobile data storage container can be initially provisioned with an appropriate namespace, which can be an abstract environment that holds logical groupings of identifiers or symbols, and associated data, allowing unique identification of objects to be stored in the mobile data storage container. It can also be provisioned with additional software at a central location. The mobile data storage container can then be disconnected at step 204 from the central provisioning location and deployed to the field at step 206. This deployment can be in a military context or it can be in an industrial, business, or any other desired context wherein the mobile data storage containers are used at a location where data is generated, regardless of how that data is generated. As noted above when the mobile data storage container is filled to a predetermined level, it can be disconnected at step 208 from the field network, returned to a more central location, and reconnected at step 210 to a network that can include multiple mobile data storage containers. Once reconnected, at step 212 the mobile data storage container can become a searchable component of the network to which it has been reconnected.

Figure 3:
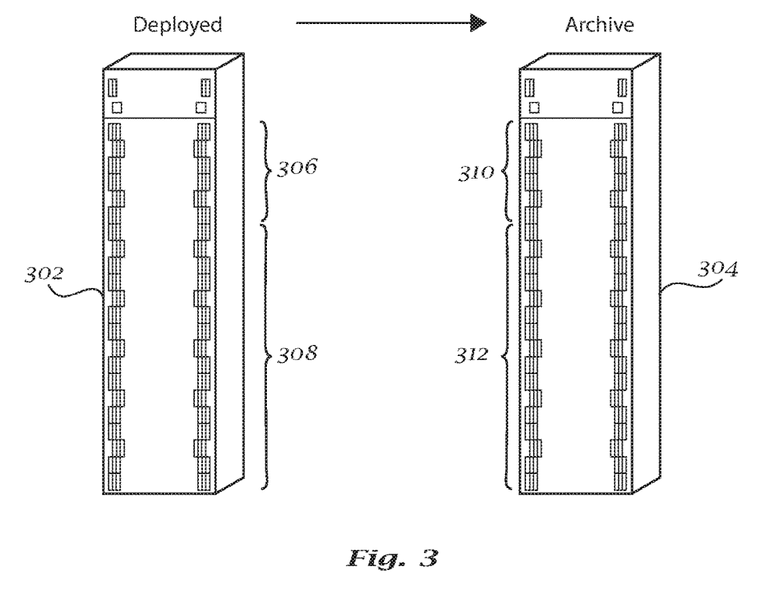
FIG. 3 illustrates an exemplary embodiment of the reuse of the mobile data storage container.

Referring now to FIG. 3, an exemplary embodiment of the reuse of a mobile data storage container is illustrated. When a mobile data storage container 302 is deployed, it uses internal processing capability to receive information from the data source, noted herein as ingest processing capability 306. The data can then be stored in storage area 308 and analyzed and acted on as the need arises for current analysis. One analysis anticipated is near term for current analysis needs of any particular user. The analysis can be useful in military contexts, and also industrial, business, or any other desired context. When the mobile data storage container 302 reaches a predetermined limit, and as noted above, it can be returned to a larger archive where it is provisioned with other analytical software 310 that can be used to analyze the data in the storage container and in that of other storage containers, converting mobile data storage container 302 into archive data storage container 304, which can be a variation of a mobile data storage container 302. Information can continue to reside on the mobile data storage container and it also may be replicated to reside on the other storage containers to create an archive storage space 312 that can be searched across multiple data storage containers.

Figure 4:
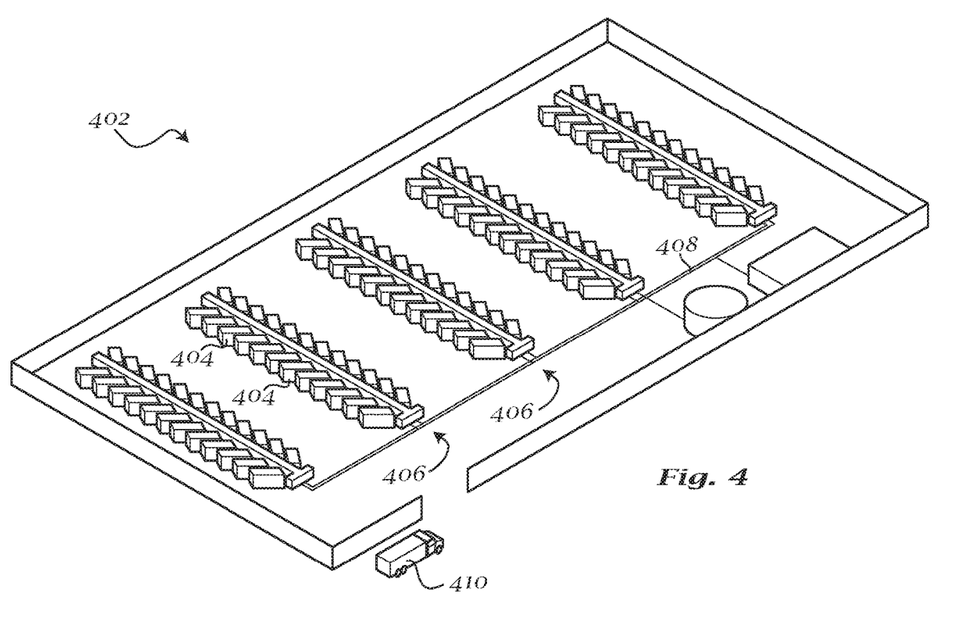
FIG. 4 illustrates an exemplary embodiment of a larger archive of mobile data storage containers.

Referring now to FIG. 4, an exemplary embodiment of a larger archive of data storage containers may be seen. This illustration simply shows multiple data storage containers 404 arranged in an archive network 402. Data storage containers 404 can be mobile data storage containers 302, archive data storage containers 304, or any other desired type of data storage container. The data storage containers 404 are peers of one another and searches of data and analysis can occur across multiple data containers simultaneously. When the data container returns to be connected to such a network 402, it can be provisioned with analytical software, for example analytical software 310, that can be common to all other containers, and the container can authenticate itself to the network so that all users can be assured that its contents are appropriate to the network 402. The network 402 can contain any number of data storage containers 404, arranged in any desired physical configuration, for example in one or more rows 406. Network 402 can contain provisions for powering and cooling data storage containers 404, such as power and water distribution system 408. Network 402 can also contain provisions for transporting data storage containers 404, for example transport truck 410. When mobile data storage containers 302 are sent to a central archive, for example network 402, data can arrive at the archive 402 already annotated based upon customer meta-tagging standards. The mobile data storage container 302 can be connected to the already existing archive 402 without massive reprocessing requirements. Further, the data can be immediately searchable once connected to the archive. Each mobile data storage container can be self-contained with power and cooling capabilities, and can be ruggedized as needed for the environment to which it will be deployed.

FIG. 4 shows this archive as a single location, but, depending on a business's requirements the total solution may require multiple disperate archives that are connected by a network providing a single, virtual archive capability to support the business mission.

The various embodiments of the present invention can provide governments, business, and various industries with an architecture that utilizes a flexible capture, process, and storage architecture for storing and retrieving massive amounts of information. The various embodiments enable the distribution of critical, time-sensitive, data storage and management, creating the ability to immediately extract and push actionable insights directly to users, be they in financial or business settings or in defense zones. The various embodiments can provide a method of extracting a large amount of data from data generation sources, for example computers, individuals, and sensors, and storing the extracted data in a massive storage unit. The various embodiments can provide storage units housed in mobile containers that can store multiple days/weeks of data in the order of petabytes (1024 terabytes). The various embodiments can integrate high performance computing devices into mobile storage containers that are able to perform critical extraction, pattern, and index processing on the received data. The various embodiments can provide a method for the efficient physical transport of the mobile storage containers 302 back to a central location, be it in the continental United States or elsewhere and to permit seamless integration into enterprise data warehouses at the central location.

In general various embodiments of the present invention include mobile data storage containers 302 that are self managing, self healing, and self replicating. The various mobile data storage containers 302 can be arranged in a peer-to-peer architecture that can allow an individual mobile data storage container 302, when connected to the network, for example network 402, to automatically identify and authenticate itself to other mobile data storage containers 302 on the network. As a consequence an architecture including multiple data storage containers 302 can be a federated peer to peer network allowing search capability across multiple connected mobile data storage containers 302. Containers of the various embodiments illustrated herein can further be connected, disconnected, and be connected to the same or other similar networks with no data loss and virtually no additional provisioning required.

Figure 5:
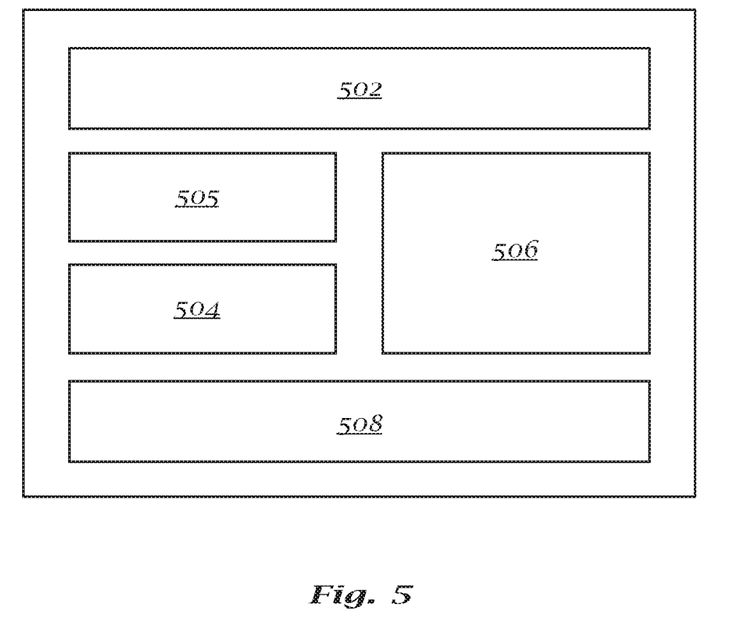
FIG. 5 illustrates major components of an embodiment.

Referring now to FIG. 5, the major components of an embodiment of a mobile data storage container 302 are illustrated. Each mobile data storage container can include a distributed scalable data management and object store engine 502 that is provisioned into the mobile data storage container prior to that container being released to the field. The container 302 can further include a Web object store 504, which can include a very large namespace 505 allowing for unique identification of, for example, billions of objects, self managing and self healing software which can allow for massive throughput of data in a secure fashion.

Still referring to FIG. 5, each individual data storage container 302 can further include private cloud computing solutions 506, which can allow for more secure storage of data. For example, various embodiments can allow for implementation of a private cloud that allows the creation and configuration of the private cloud. Such programs can further allow for accessibility of the data to authorized administrators, analysts, developers, and end users. Such programs can further allow for preconfigured firewall and other secure settings prior to deploying each individual data storage container 302 into any field activity. In so doing, enterprise-wide capabilities, including virtualization, operating systems, and various application frameworks can all be permitted with the data collected in any given mobile data storage container as soon as that container is connected to the network.

Referring still to FIG. 5, as an integral part of any fielded mobile data storage container 302, each container 302 can further include a high-speed internal network 508 that can allow searching of data internal to the mobile data storage container as well as among and across the various data storage containers of any network of which it is a part.

When connected together, multiple data storage containers 302 can include a distributed archive of information, which can require multi-factor authentication to enhance security. A further reconnect service can permit establishing a peer-to-peer operation between multiple data containers 302 connected to a network, for example network 402. As each mobile data storage container 302 is connected to the network 402, automatic object replication can occur across each mobile data storage container in the network 402, which can enhance operational capability in the event of a hardware failure of any given storage container. This architecture can allow for linear scalability to effectively generate exabytes/zettabytes of storage and retrieval.

Each mobile data container 302 can be a peer to other similar data containers 302. When networked, the data containers 302 each can be independent nodes capable of seeing all other data containers 302 within the network. The data containers 302 can each have a unique portion of the overall namespace 505 by which data in the data containers 302 may be uniquely identified and unambiguously sorted from data in other data containers 302. The index associated with each data container portion of the overall namespace 505 can be discoverable by the other data containers 302 in the network 402 of data containers 302, thereby allowing complete searching to be accomplished. In this fashion the network of data containers 302 can form a complete archive of all data retrieved and stored in the individual data containers 302. Since each container can be a peer to all other data containers 302, the data in a data container 302 is self managed yet available for queries from other data containers 302.

When a new data container 302 is integrated into an established network 402, all algorithms necessary for searching the data of the new data container 302 can be "pushed" to the new data container 302. In this fashion, each data container 302 can remain a peer of all other data containers 302 since it will have the same search capabilities as all other data containers 302 in the network 402. As search and analysis algorithms are updated in any data container 302, those same algorithms are provisioned to all other data containers 302 of the network 402.

Further, in order to account for the potential for a data container 302 to be unavailable for search for any number of technical difficulties, vacant space can be left in each data container 302 in the network 402 so that necessary data from other data containers can be offloaded (replicated) from one data container 302 and stored in another. When this occurs, the data being transferred among data containers 302 can retain their unique objective identification within the overall namespace 505 associated with the data that is transferred. In this fashion, the overall network 402 can understand where data is derived from at all times. This form of data replication can preserve the overall integrity of the networked data containers 302 and effectively result in a self-healing object store that is accessible to the applications stored on a plurality of data containers 302.

In various embodiments, mobile data containers 302 can be any desired size. Mobile data containers 302 may be containers of any standard length, for example 10-foot, 20-foot, 40-foot, 45-foot, 48-foot, or 53-foot, or can be of any other desired length. Mobile data containers 302 can be a standard height, for example 8 feet high, or they can be high cube containers at 9 feet 6 inches high, half height containers at 4 feet 3 inches high, or they can be any other desired height. In some embodiments, mobile data containers 302 can be adapted to be transported by freight, rail, or both. In other embodiments, mobile data containers can be sized and adapted to be transported by air, for instance by civilian or military aircraft. As an example, mobile data containers 302 may be any desired configuration of Unit Load Device, and therefore compatible with standard cargo aircraft. Other embodiments of mobile data container 302 may be compatible with any other aircraft or method of airborne shipment or transport as desired.

In various embodiments, mobile data containers 302 may include power and heating, ventilation, and air conditioning (HVAC). The mobile data containers 302 may contain extendable memory with up to multiple petabytes, for example 3 petabytes, of storage per container; high performance computers for data storage, data indexing, and data access; inexpensive, massive, and/or dense storage memories; highly mobile and self-contained networks for simple physical security.

The embodiments discussed can result in a dynamically scalable architecture that can accept input from additional mobile storage containers 302 and allow the archived information of those containers to be a part of the on-going intelligence analysis task. This can be further accomplished by meta-tagging the contents of the information in the mobile container archive. This can allow existing and future algorithms to search newly arrived data. Using the approach described in the embodiments noted herein, data containers 302 can become part of a larger archive, for example network 402, without significant reprocessing. In this fashion, the newly arrived archived data can be immediately or nearly immediately searchable.

From an operational perspective, the portable storage units 302 can be first provisioned with the necessary hardware and software, for example ingest processing software 306, needed to perform in-theatre analysis. This can involve programs for obtaining and importing data from sensors of any desired type, programs for tagging data, and programs for performing in-theatre analysis. The tagging of data is carried out in a standardized form that is consistent with tagging needs of the larger database, for example network 402, in for example the United States.

The software can also include multi-level authentication of each mobile data storage unit 302 so that security and operational characteristics are compatible with the peer-to-peer network, for example network 402, on which the data container can become resident.

The data storage container 302 can then be deployed and used in ongoing data collection and analysis tasks. While deployed, the data container 302 can be integrated with other data containers 302 so that a seamless addition of data to the analysis is accomplished. When the temporal requirements of the data in any container 302 are triggered, that data container 302 can be disconnected from the local network/archive of data containers 302 and moved to a central location where it can be reconnected to data containers in another, perhaps larger, archive, for example network 402, although this is not meant as a limitation. Since tagging of data and analysis algorithms are similar due to the initial provisioning, the newly added data container 302 can be rapidly integrated into any on-going analysis task.

A function of the provisioning center, upon return of a data container 302, is to insure complete compatibility with the existing archive in, for example, the US. This "return" function can involve, without limitation, upgrade to any analysis programs, for example ingest processing software 306, that have been used to the latest versions of such programs that are being used at the central facility or archive, and/or installation of programs that were not used at the local network but are used in the central facility for other analysis functions. The provisioning center can also perform diagnostic checks on the returning data container 302 to ensure that it is operating properly and that it not suffering from any degraded performance. Once all operational tests are passed, the provisioning center can determine how best to integrate the newly arrived data container 302 into the existing archive, for example network 402. This can also involve notices to appropriate users that new data has arrived and is available for searching.

Various embodiments can allow for there to be a very large, single namespace, for example namespace 505 discussed above, for each of the multiple data storage units 302 that in turn can allow billions of objects to be uniquely identified. This unique identification can allow for highly specific storage and retrieval of objects of interest. Such unique storage naming of objects can allow for very precise retrieval of objects of interest.

In another embodiment, the client or user can be permitted to define a namespace 505 in a manner that is germane to the client's interests. Thus a particular government organization having the need to store and retrieve large amounts of data can use a namespace 505 that is particular to the government agency in all, the project, the subject matter, and a huge variety of other factors to create the desired namespace. Again this would allow the government agency, for example, to do its precise analysis tasks in a highly efficient manner.

Various other embodiments allow for self-managing of data stored through business rules that can be applied to individual objects and sets of objects. For example, each namespace 505 can have separate rules associated with the namespace 505 in general, and with any subcategories of data that is stored in that namespace 505. Not only will such naming hierarchies allow for effective retrieval of data, or will also enhance the security posture of the data that is stored in any mobile data storage unit. In effect, that namespace 505 will permit (or deny) access to data based upon business rules associated with the namespace 505.

Various other embodiments have the ability to federate access and replicate objects across many containers 302. This means that information that is initially stored in any given mobile data storage container 302 can be replicated in other data storage containers, for example mobile containers 302 or archive containers 304, when that new container 302 is installed in the network, for example network 402. This in turn can provide data redundancy in the event of a failure of any particular storage medium. This gives the ability to continue operation without loss of data when disk drive failure occurs.

Yet another embodiment allows for integration of third party encryption technology. For example, in some embodiments symmetric cryptography, asymmetric cryptography such as public key cryptography, or any other civilian or military encryption scheme or system may be used. Thus any particular data storage container 302 or series of containers can be provisioned with third party encryption technology during the provisioning process. For example, data storage containers 302 can be provisioned with hardware encryption technology such as disk encryption, or with encryption software such as Data Encryption Standard (DES) software, Advanced Encryption Standard (AES) software, Digital Signature Algorithm (DSA) software, Pretty Good Privacy (PGP) software, or any other type of encryption software or system as desired.

In this manner when the mobile data storage container 302 is placed in the field, all information that reaches data storage container 302 that is destined for the particular organization can be encrypted in a manner that only that organization can access. When the data storage containers 302 are subsequently shipped to the appropriate network, data can be decrypted provided that the third-party decryption technology is fielded to the location where that container resides.

From an operational perspective, the various embodiments discussed above allow any given user to have the ability to disconnect a container 302 from the network 402 and still assign unique object ID for the data within the portion of the overall namespace 505 contained in the mobile data storage container 302. Further, the container 302 can be connected to the network 402 without any additional data processing requirements since its namespace ID will be known to the network 402 and appropriate data processing capabilities can be assigned based upon the namespace ID.

Because of the Federated and data replication capabilities of each mobile data storage container 302, when a container 302 is removed or eliminated from the network 402, it is possible that all of its data has been replicated in different data containers 302 on the network 402. Thus any specific data container 302 can have its contents replicated in various other locations within the network. The end result is that the mobile data storage container 302 can be removed from the network 402 without loss of data on the network. This further allows very critical analysis and evaluation tasks to continue without interruption.

The use of mobile data storage containers 302 as discussed above can allow for the continual migration of data to newer technologies without additional cost or effort due to the fact that all containers 302 on the network 402 can be peers of one another. If any particular user improves data analysis software or algorithms, that software or algorithms can be populated to all of the data containers 302 on the network 402. Similarly, if newer mobile data storage containers 302 are used with better data storage capabilities, the data replication capabilities of the various embodiments discussed above can allow that data to be replicated into the newer local data storage containers 302 with little or no effort on the part of the user. As a consequence, the network 402 of mobile data storage containers 302 can constantly be upgraded and the data on the network can be automatically migrated to the newer data storage containers 302. Older technology mobile data storage containers 302 can be retired without loss of data, since it has already been replicated onto the newer technology with any new algorithms or software.

As an example and without limitation, if disk drives are used that have a mean time between failure for a 100 TB of disk drives of around 39 months of operation, disk drive failure is not generally to be anticipated. However if any disk drives were to fail, no data would be lost due to the data replication schema as noted above.

As another example, solid-state drives (SSDs) can be used. In contrast to magnetic disk drives, SSDs can use microchips that retain data in non-volatile memory chips and often contain no moving parts. Compared to electromechanical hard drive disks, SSDs can provide less susceptibility to physical shock, increased reliability, silent operation, and lower access time and latency. As another example, hybrid drives can be used. Hybrid drives can combine electromechanical hard drive disks and SSDs into one unit, which can provide some of the speed, reliability, and other advantages of SSDs with the relatively lower cost of electromechanical drives.

Various embodiments discussed above have the ability to integrate 1000s of mobile data storage containers or more in a single namespace 505 on a network 402, this can provide for a huge amount of data storage and data security. Data storage containers of the various embodiments discussed above can accept, for example, 200 TB of data in a four hour window. This can allow for a significant amount of data streaming from multiple sources to be safely stored and subsequently transported. Further, as an example each single mobile data storage container 302 can support 9,000 to 10,000 frames per second of geospatial data analysis as individual images or as layers of images using various protocols. For example, software offered by PIXIA Corporation allows rapid access to large data files. Using a service oriented architecture, a program such as that offered by PIXIA Corporation, as an example, can be provisioned into a mobile data storage container 302 before it is shipped to the field. When the mobile data storage container 302 is filled to a predetermined level, it can be removed from the field and shipped to a network 402 of mobile data storage containers 302 each of which can respond to data requests from PIXIA. This is meant as an example only since many other types of software may be provisioned into a mobile data storage container before it is fielded for any specific application.

Figure 6A:
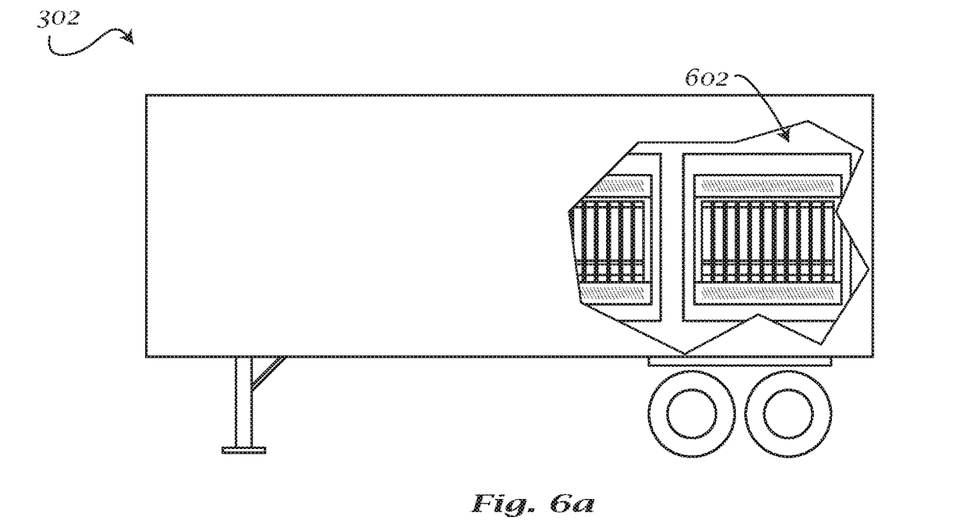
FIG. 6A illustrates an exemplary embodiment of the integration of the computing devices and servers within mobile large scale data storage units.
Figure 6B:
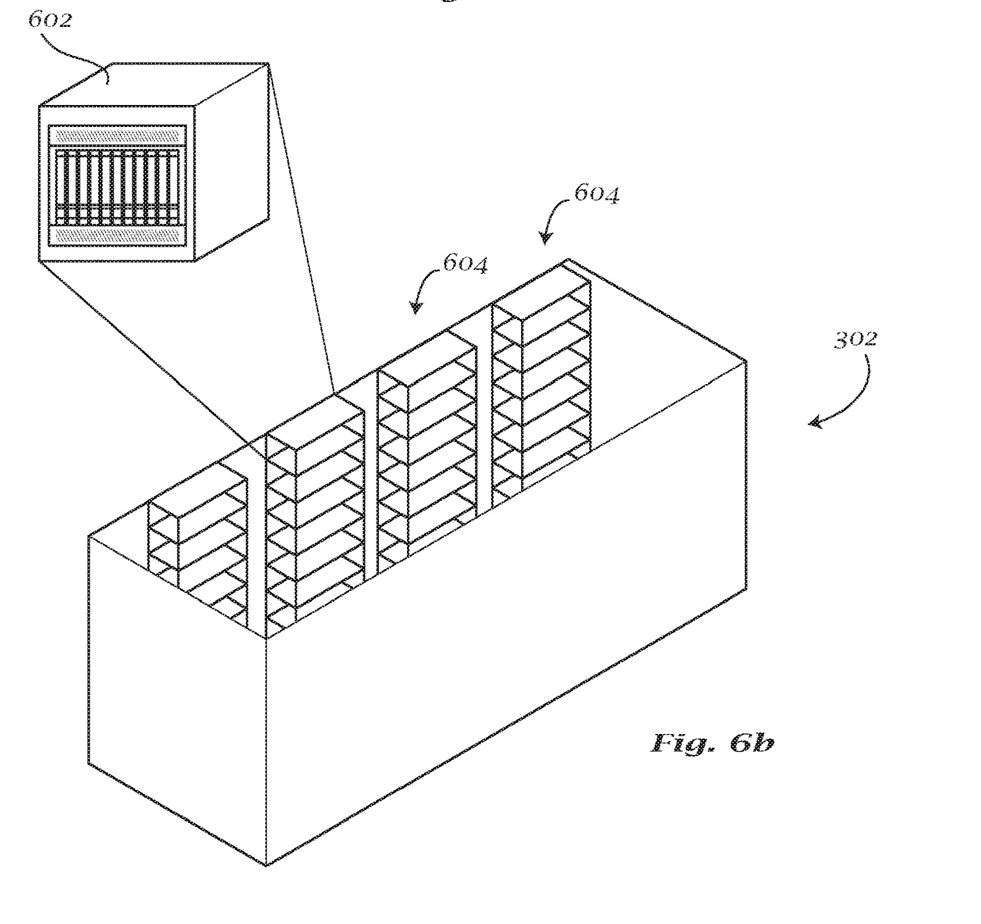
FIG. 6B illustrates an exemplary embodiment of the integration of the computing devices and servers within mobile large scale data storage units.
Figure 7:
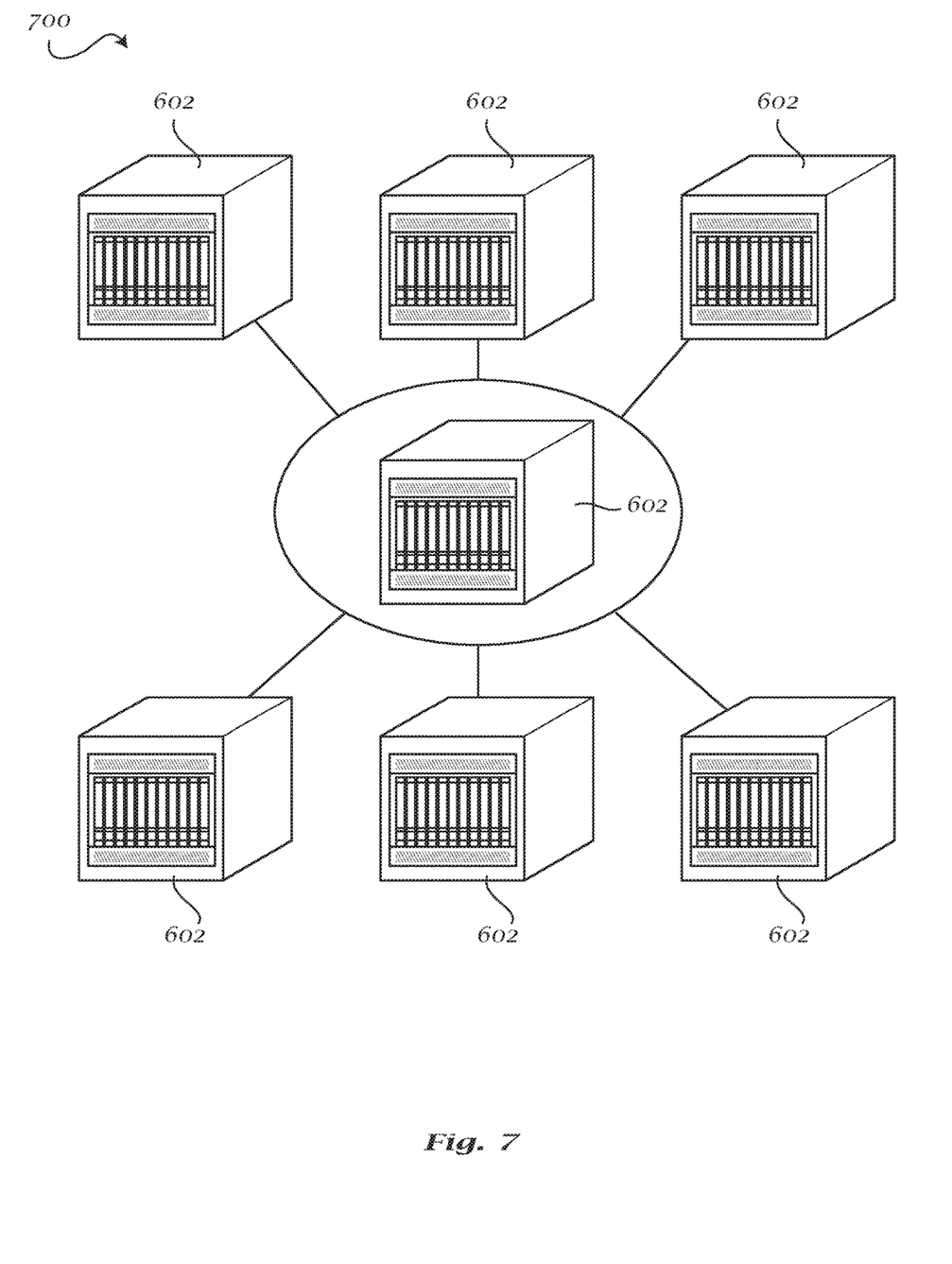
FIG. 7 is a network diagram illustrating an exemplary embodiment of the interconnection of the computing devices and servers within and across the mobile large scale data storage units.

In various embodiments, one or more specialized and/or commercially available server devices may be mounted in a mobile data container 302, as illustrated in FIG. 6A. Likewise, FIG. 6B illustrates that, in various embodiments, a large number of high performance storage and server devices 602 may be interconnected to create an array 604 of high performance computers or supercomputers having multiple petabytes of storage space. The interconnected computers may be interconnected both within a single mobile data container 302 and to other mobile data containers 302, as illustrated in FIG. 8. Interconnecting the computers in, and across, the mobile data containers can provide deployable high capacity data storage and analysis centers. These data analysis centers may be modular, self-contained, fully portable data environments featuring extreme server and storage densities. The data analysis centers may have highly-efficient cooling systems and be implemented in a manner that supports a high degree of serviceability. In various embodiments, the data analysis centers may combine miniature high performance computers, such as those described above, and inexpensive mass storage arrays. This combination can enhance the operational capabilities of the system by improving the ability to collect, protect, and move multi-petabytes of data within or among various areas of operations.

In the various embodiments, once data is stored, it can be indexed using a fully integrated, high performance digital indexing and storage solution. Multi level security can be maintained by partitioning the data and configuring the fusion center as a set of disparate isolated networks. This modular, container-based, architecture also provides the ability to respond to changing requirements which can ensure scalability to meet increasing demand for data and data analysis.

This architecture and methodology can be useful in military contexts, and it can also useful in all manner of civilian operations and tasks as well. For example, financial instruments and stock trading results in huge amounts of data being generated on a minute by minute basis. Records of stock trading and negotiable financial instruments are required to be stored on a multitude of exchanges as well as other related sites for an indefinite amount of time. The ability to add new storage containers and remove those that are less current, yet still allow full searching and analysis would greatly ease the burdens of storage research In a similar fashion to the generation of financial data, healthcare related data is constantly being generated and updated. This is for example true in the area of medical imaging. The image data from various medical sensors is increasing higher resolution and occurs in greater quantities as more and better imaging devices are generated. As a result, hospitals, insurance carriers, individual's doctors and patients all have a need for enhanced storage and retrieval of electronic heath records. Scaled versions of the embodiments illustrated herein can serve the healthcare industry such as with medical data, environmental data collection, commercial data collection operations, and financial transactions of all types to name but a few.

State, local, and federal government agencies are also generating increasingly large amounts of data. At the local level, cities and counties increasingly rely upon all matter of data collection from security cameras and weather related information, to civilian satellite image and telemetry information. As governments increasingly study impacts of environmental change as well as day to day weather surveillance, not to mention intelligence collection at all levels, it is clear that the need for data storage of all types of government related information is mandatory. Given that there are both current and less current data analysis needs, embodiments described herein can be useful for the collection and analysis of such information and the subsequent storage and long-term evaluation of that same information.

Individual industries also generate large amounts of current data from call detail records to the internal operations of domestic and multilateral corporations. This information also requires analysis according to various rules and regulations promulgated by the governments of the countries in which the corporations reside. As a result, embodiments of the present invention can also be useful in this context.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, SSD storage, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A method for embedding analytical software in a first mobile data storage unit in a peer-to-peer network, the first mobile data storage unit having a data processor, the method comprising:
    provisioning the first mobile data storage unit at a first location, the provisioning comprising installation of an analysis software;
    transporting the first mobile data storage unit to an area of operations at a second location;
    connecting a plurality of second mobile data storage units with the first data storage unit in a first peer-to-peer network;
    defining a custom namespace separate from at least one other namespace;
    assigning the first mobile storage unit a namespace ID within the custom namespace, wherein data objects ingested into the namespace ID are assigned unique identifiers, wherein the namespace ID is persistent through disconnection and reconnection of the first mobile storage unit;
    identifying one or more processing tasks to be assigned to the first mobile data storage unit, and allocating data processing to the first mobile storage unit, based on the namespace ID;
    processing data in each of the mobile data storage units independently of the processing of data in the other mobile data storage units in the peer-to-peer network;
    aggregating the results from the independent processing performed in each of the mobile data storage units from all the mobile data storage units within the custom namespace into a preliminary data set; and
    transmitting the preliminary data set to one or more analytical environments for additional processing.

2. The method of claim 1, wherein the custom namespace is defined based on at least one criteria, the at least one criteria comprising at least one of an operating organization, a project to be associated with the namespace, or a subject matter area.

3. The method of claim 2, wherein data to be provided to the custom namespace is sorted based on the at least one criteria and the custom namespace is automatically populated with data relevant to the namespace.

4. The method of claim 1, wherein the step of connecting the plurality of second mobile data storage units with the first mobile data storage unit in the first peer-to-peer network comprises pushing one or more algorithms stored on the plurality of second mobile data storage units to the first mobile data storage unit.

5. The method of claim 4, wherein the algorithms comprise at least one of search algorithms or analysis algorithms.

6. The method of claim 1, further comprising:
    pairing the first mobile storage unit with one or more mobile data storage units in the custom namespace;
    replicating the data of the first mobile storage unit on the one or more paired mobile storage units; and
    removing the first mobile storage unit from the peer-to-peer network;
    wherein the one or more paired mobile storage units remain in operation on the peer-to-peer network.

7. The method of claim 6, further comprising:
    connecting a replacement mobile data storage unit with one or more mobile data storage units in the peer-to-peer network; and
    automatically replicating the data of the first mobile storage unit on the replacement mobile data storage unit.

8. The method of claim 1, wherein the one or more analytical environments perform different processing actions on the preliminary data set using different analytical techniques and approaches as required by a business process.

9. The method of claim 1, wherein data to be processed is sorted into the custom namespace based on subject matter, and wherein one or more analysis tasks precisely tailored to the subject matter is executed on the data to be processed.

10. The method of claim 1, wherein the step of processing data in each of the mobile storage units independently of the processing of data in the other mobile data storage units in the peer-to-peer network further comprises defining one or more annotations based on one or more meta-tagging standards, and assigning the one or more annotations to the data based on the one or more meta-tagging standards.

11. The method of claim 1, wherein the one or more analytical environments are at least one of another processing node on the peer-to-peer network or a separate environment on a separate network.

12. The method of claim 1, wherein at least one processor operable to execute the analysis software within the mobile storage units is dynamically allocated to the analysis software for processing data.

13. The method of claim 1, wherein an activation of the analysis software can be achieved by any user who has access to the peer-to-peer network.

14. A method for collecting, storing, and analyzing information, comprising:
    provisioning a first mobile data storage unit at a first location, the first mobile data storage unit having a data processor, the provisioning comprising installation of an analysis software to ingest and process a single data type or a related family of data types in a namespace;
    transporting the first mobile data storage unit to an area of operations at a second location;
    connecting the first mobile data storage unit with one or more mobile data storage units in a peer-to-peer network;
    collecting information in the area of operations;
    wherein the first mobile storage unit is assigned a namespace ID, wherein data objects ingested into the namespace ID are assigned unique identifiers, wherein the namespace ID is persistent through disconnection and reconnection of the first mobile storage unit, and wherein the peer-to-peer network is configured to identify one or more processing tasks to be assigned to the first mobile data storage unit and allocate data processing to the first mobile storage unit based on the namespace ID; and
    wherein the namespace includes a plurality of different types of storage media, the plurality of different types of storage media including the one or more mobile data storage units and at least one other type of storage media, each of the different types of storage media having a unique identifier on the namespace.

15. The method of claim 14, further comprising, following the step of connecting the first mobile storage unit with the one or more mobile data storage units in the peer-to-peer network, performing the steps of:
- replicating the data of the first mobile storage unit on the one or more paired mobile storage units; and
- removing the first mobile storage unit from the peer-to-peer network;
- wherein the one or more paired mobile storage units remain in operation on the peer-to-peer network.

16. The method of claim 15, further comprising:
- connecting a replacement mobile data storage unit with one or more mobile data storage units in the peer-to-peer network; and
- automatically replicating the data of the first mobile storage unit on the replacement mobile data storage unit.

17. The method of claim 14, wherein the plurality of different types of storage media includes at least one of RAM, ROM, EEPROM, optical disc storage, magnetic disk storage, magnetic storage, or SSD storage.

18. The method of claim 14, wherein the one or more analytical environments are at least one of another processing node on the peer-to-peer network or a separate environment on a separate network.

19. The method of claim 14, wherein at least one processor operable to execute the analysis software within the mobile storage units is dynamically allocated to the analysis software for processing data.

20. The method of claim 14, wherein an activation of the analysis software can be achieved by any user who has access to the peer-to-peer network.

\* \* \* \* \*